INVENTOR
Pietro Fiorentini
BY
Patent Agent 3,103,949
PRESSURE RELIEF DEVICES
Pietro Fiorentini, Via della Moscova 38, Milan, Italy
Filed Aug. 9, 1960, Ser. No. 48,523
Claims priority, application Italy Dec. 2, 1959
6 Claims. (Cl. 137—492)

The present invention relates to pressure reducing valves for gaseous fluids, having a double or a single seating.

The invention refers especially to the second type of reducing valve, that is the one with a single balanced seating, inasmuch as it is the most suitable for achieving a positive complete closure and reliable reduction or control of the pressure.

Such pressure reducing devices, for the control of the valve regulating the communication between the high pressure tube and the reduced pressure tube, use a diaphragm valve means, the membrane of which has one surface subjected to the low pressure which it is desired to be kept constant, and the other surface subjected to the action of a suitably set spring or to a pressure action controlled by pilot means or servomotor means. The valve itself is balanced in that its rear surface too is subjected to a pressure equal to the incoming pressure so as to make the movements of the valve itself more balanced and easier. However, while such a kind of pressure reducing means have given results satisfying requirements when the pressure downstream of the valve must have values so big that the pressure differences brought about by friction and variations in the movement of the valve and the other members are within the tolerances, this no longer applies, and the results are no longer satisfactory when the pressure downstream of the valve has to be absolutely without fluctuations or when it has to have a low absolute value.

The present invention has as an object to provide a pressure reducing valve of the above-defined type whose pressure is accurately controlled and in which first of all the manner of keeping the valve balanced in its movement is unique. Indeed, the surfaces of the hitherto known types of valve, one of them being subjected to the pressure upstream of the valve, and the other surface to the same pressure but conducted into a closed chamber or communicating with the inlet tube for the gas, are equal, and the pressure is also kept at the same value owing to a partial drilling carried out in the valve stem which makes the lower chamber of the valve communicate with the chamber of the incoming gas. It will be apparent that by resorting to such an expedient the valve will be kept balanced whenever the pressure upstream of the valve varies.

Such a system, however, gives rise to some inconveniences inasmuch as the balance can never be perfectly achieved.

As a matter of fact when shifting from closed valve to open valve, the load on the surface corresponding to the valve seating has varied on account of the fact that, when the valve is closed, the effort necessary for actuating the valve is greater because the seating area is covered and is thus not acted on by a pressure, and moreover a certain adhering effect between the closing resilient disc and the metal seating of the valve must be overcome. These influences are not present when the valve is opened. Furthermore, the friction existing between the sealing rings on the shaft, as well as on the guide elements of the valve, give rise to forces which vary as a function of the incoming pressure. Furthermore, when passing from closed valve to valves which are wholly opened, the pressure acting on the valve surface varies in that, in the case of a valve wholly opened, there is a pressure load loss upstream of the valve brought about by the expansion of the fluid itself. Because of this fact, even though the two surfaces of the valve are similar to one another the balance is never completely achieved. This fact brings about load variations on the valve which make themselves felt on the membrane connected to the shaft itself of the valve, which in turn causes continuous variations of the reduced pressure value. In order to partially remedy this drawback, diaphrams are applied having very large surfaces, which of course are cumbersome, and when it is the case of working with pressures of a middle value, then it is necessary to use springs powerfully loaded which are therefore somewhat stiff, and, if they diminish in relation to the balance efforts give rise—because of their stiffness—to an increase of the load loss because of the opening to the utmost.

In order to prevent all the above-mentioned drawbacks which particularly make themselves felt when it is desired to lower a pressure from a value measured in atmospheres to a value measured in millimeters water column (as in the case, for instance of pressure reducing means for gas distribution mains in towns, which work at pressure values varying as much as from 50 to 150 mm. of water column) a pressure reducing valve has been designed wherein the balance surface have not been made equal, but have appreciably different values, these values differing, for instance, in a ratio of the order of 2 to 1. This, together with other expedient steps allows balancing of the valve in all its positions, that is to say from its wholly closed position to the position wherein it is open to the greatest extent.

Another improvement in the pressure reducing valve means according to the present invention comprises a further device with a double passage connected to the membrane which controls the amount of the back pressure acting on the diaphragm.

The combination of the two improvements has resulted in the balancing action making the valve act directly in all its opening and closing movements without the direct action of the diaphragm on the shaft being necessary. The accompanying drawings show schematically and by way of example an embodiment of the pressure reducing means according to the present invention. In the drawings.

Figure 1:
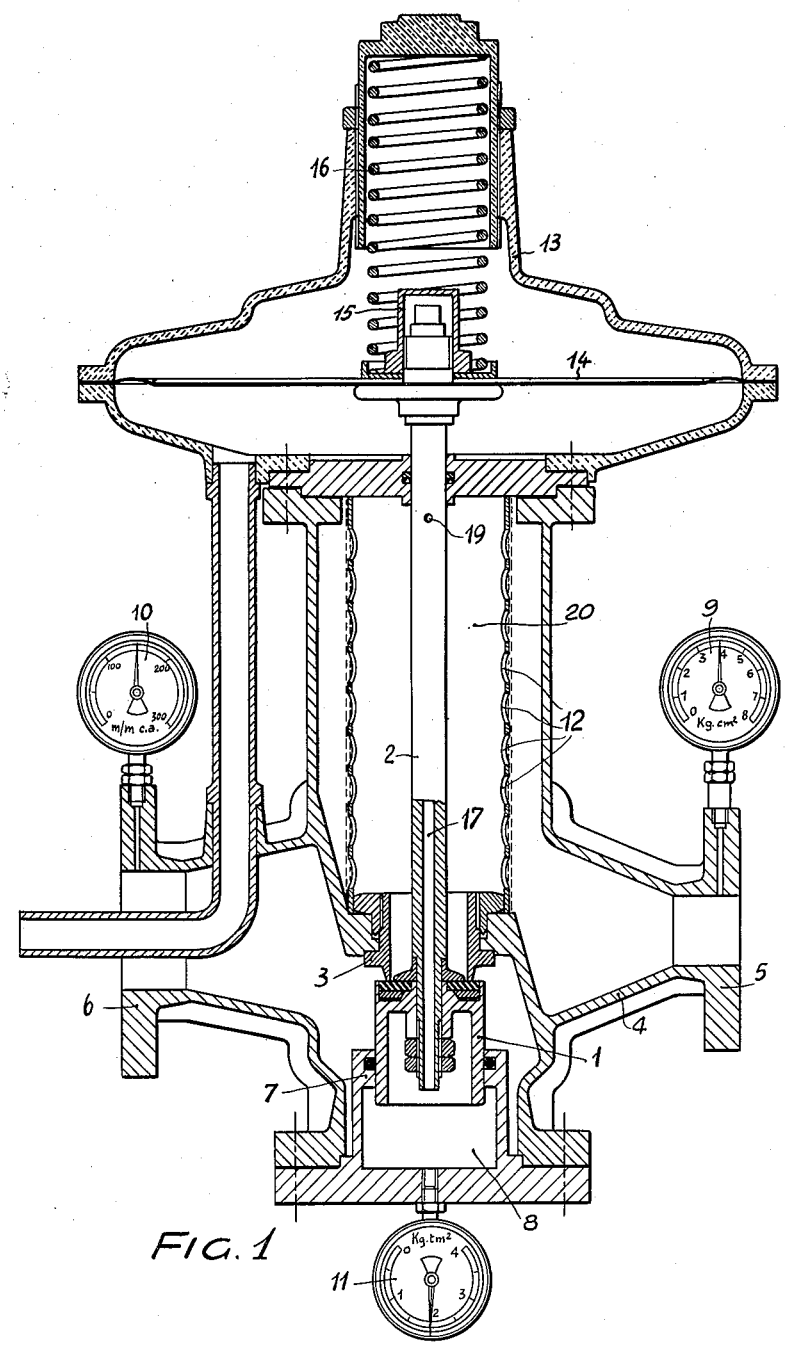
FIGURE 1 is an axial view in section of a complete pressure reducing means.

In FIGURE 1 of the drawings it will be seen that the pressure reducing means comprises a valve 1, integrally mounted on its shaft 2, and combined with a fixed seating carried by a body 4 which on one side has the connecting piece 5 for connection to the pipe for the incoming fluid, and on the other side has the connecting piece 6 for connection to the reduced pressure pipe.

As clearly illustrated in the figure, valve 1 is shaped like a piston, slidable in a guide element 7 integral with a casing enclosing the valve back pressure chamber 8.

The gauges 9, 10 and 11 are respectively for checking the incoming pressure, the outlet reduced pressure from the reducing means, and the pressure in the balancing or back pressure chamber.

In the body 4 of the pressure reducing means is mounted in a manner known per se, a filter element 12, and the shaft 2 of the valve runs upwardly through the membrane containing member 13, this membrane 14 being loosely connected with shaft 2. The connection between diaphragm 14 and shaft 2 is effected by means of a device incorporated in a housing 15 which will be disclosed hereinafter in greater detail while 16 is the set spring loaded according to the required pressure of the fluid flowing from the reducing means through the connecting piece 6. In the pressure reducing means as illustrated the surface of valve 1, subjected to the pressure coming in through port 5 is half the value of the surface shown by the valve itself in relationship with back-pressure chamber 8. Therefore, if said valve is to be balanced it is necessary that the pressure in the chamber 8 is half the value of the pressure of the fluid flowing in from pipe 5 and shown by the pressure gauge 9.

Shaft 2 of the valve differs from the above mentioned known pressure-reducing devices in that it is formed with a bore extending over its whole length, and in addition there is another drilling extending over a fair portion of its length. Thus said shaft 2 is formed with a bore 17 which extends up to the chamber 18 provided in the regulating device which will be disclosed hereinafter, whereas another bore 19, which has an end terminating at the inside 20 of filter 12, extends up the restricted portion 21 of the shaft 2 of the valve, closed by a resilient pad 22 supported by a stationary member 27 and constituting one of the two small control valves which will be disclosed hereinafter.

Another new feature of the pressure reducing means according to the present invention relates to the connection between the shaft 2 of the valve and the diaphragm 14, this connection being loosely realized but in such a manner as to allow a displacement of some millimeters only of the elements integral with the shaft with respect to the elements integral with the membrane all of them being fitted with a sealing device fitted as will now be disclosed. The end of shaft 2 is solid with sleeve 23 in a sliding relationship within flange sleeve 24, which together with the other element 25 tighten between them diaphragm 14 and guide this latter.

On said flange sleeve 24 is fitted a pivot 26, by means of bushings 26a, and extending diametrically this pivot 26 is fixed to a cylinder 27 by a bushing 27a and which cylinder has an axial bore and whose two ends are formed with resilient pads 22 and 28 constituting the valves checking the pressure within chamber 8 as will be disclosed in greater detail hereinafter.

The drilling 29 provided in the pin 27 at one of its ends terminates in the chamber 30, while the other end terminates in chamber 18, these chambers thus communicating with each other, and being in direct communication with chamber 8 through drilling 17 of shaft 2 of valve 1. Sleeve 23 integral with the end of shaft 2 of valve 1 is formed with two large slots 31 for the passage of pivot 26 for the purpose of allowing relative displacement between said pivot 26 solid with membrane 14 and sleeve 23 with the members rigidly connected with it, among them shaft 2 of valve 1. Tight sealing between chambers 18 and 30, and the ports connected with them, and the outside are secured by metal bellows 32 and 33 which however allow the above described displacement of the elements connected with membrane 14 with respect to the elements connected with the valve 1; whereas the communication between chamber 18, and thence valve back pressure chamber 8 and chamber 20 in which there is virtually the same pressure as the conduit upstream of the pressure reducing means, is allowed only through the small valve embodied in the bored boss 21 of shaft 2 and the resilient pad 22 carried by the element 27 secured to diaphragm 14. The two elastic pads 28 and 22 are lightly compressed in their rest position, so that they realize a perfect tightness, and the pressure existing in the chambers 30—29—18—17 exactly corresponds to the "intermediate pressure" of the chamber 8.

When the pressure at the outlet 6 tends to increase, because the request of the gas by the users decreases, the diaphragm 14 rises and compresses more strongly the pad 28, opening the underlying hole 19, flowing gas at high pressure in the chamber 8, and increasing the middle pressure. The valve 1 pushed by the higher pressure of the chamber 8, tends to shut on its seat 3 and thus the quantity of gas flowing from inlet 5 to the outlet 6 decreases. This tends to cause the pressure at the outlet to hold at the rated value.

In the case of decreasing of the low pressure at the outlet, the diaphragm 14 lowers and more strongly compresses the pad 22, which opens the pipe 35.

The middle pressure of the chamber 8 put in connection with 17—18—29—30 discharges through the hole 35 into the chamber 36 (which is in connection with the low pressure at the outlet 6), through the clearances existing among the elements a, b, c, d, e. The chamber e underlying the diaphragm 14 is in connection with the outlet 6 as shown in FIG. 1.

The decreasing of the pressure of the chamber 8, due to the opening of the pipe 35, brings about a displacement of the valve 1, downwardly, and thus a removal of the same from its seat 3, and thereby a greater opening of the passage of the gas from 5 to 6, which fact makes the pressure at the outlet 6 higher, and controls the pressure at the outlet at the rated value.

The pressure reducing means disclosed above function as follows. It is assumed that the pressure upstream of the device, as shown by the pressure gauge 9, is as great as 4 atm.; it is also assumed that the pressure required in the conduit downstream of the device, as indicated by pressure gauge 10, should be 150 mm. water column, and that the lower surface of valve 1 is twice the effective surface of the valve itself subjected to the 4 atm. pressure.

Thus the pressure in the chamber 8, needed for balancing member 1, should be as high as 2 atm. more or less the friction which during the closing and opening operations makes itself felt on the valve.

The diaphragm 14 of the pressure reducing means according to the present invention subjected to a steady load realized through a spring or through a fluid, which establishes its setting, is responsive, due to its surface, also to the slightest pressure variations which occur in the downstream fluid, and keeps this pressure perfectly checked, no longer acting directly on the shaft 2 of the valve as it is loosely arranged on this shaft through the clearances X1 and X2. Its function is to act as a pilot means for the back pressure existing in the chamber 8 which actuates the valve of the pressure reducing means, limiting its working to acting on the small valves previously described.

Figure 2:
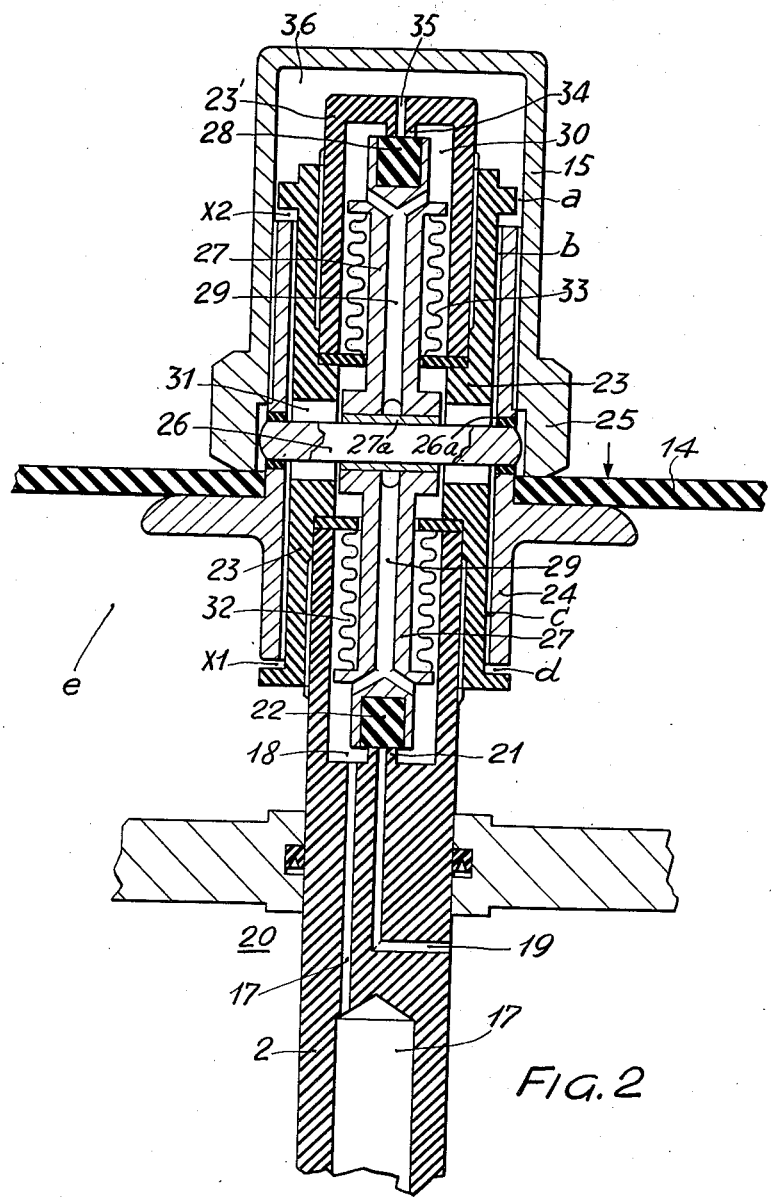
FIGURE 2 shows in detail, on an enlarged scale and in axial section, the device for controlling automatically the back pressure acting on the valve.
Figure 3:
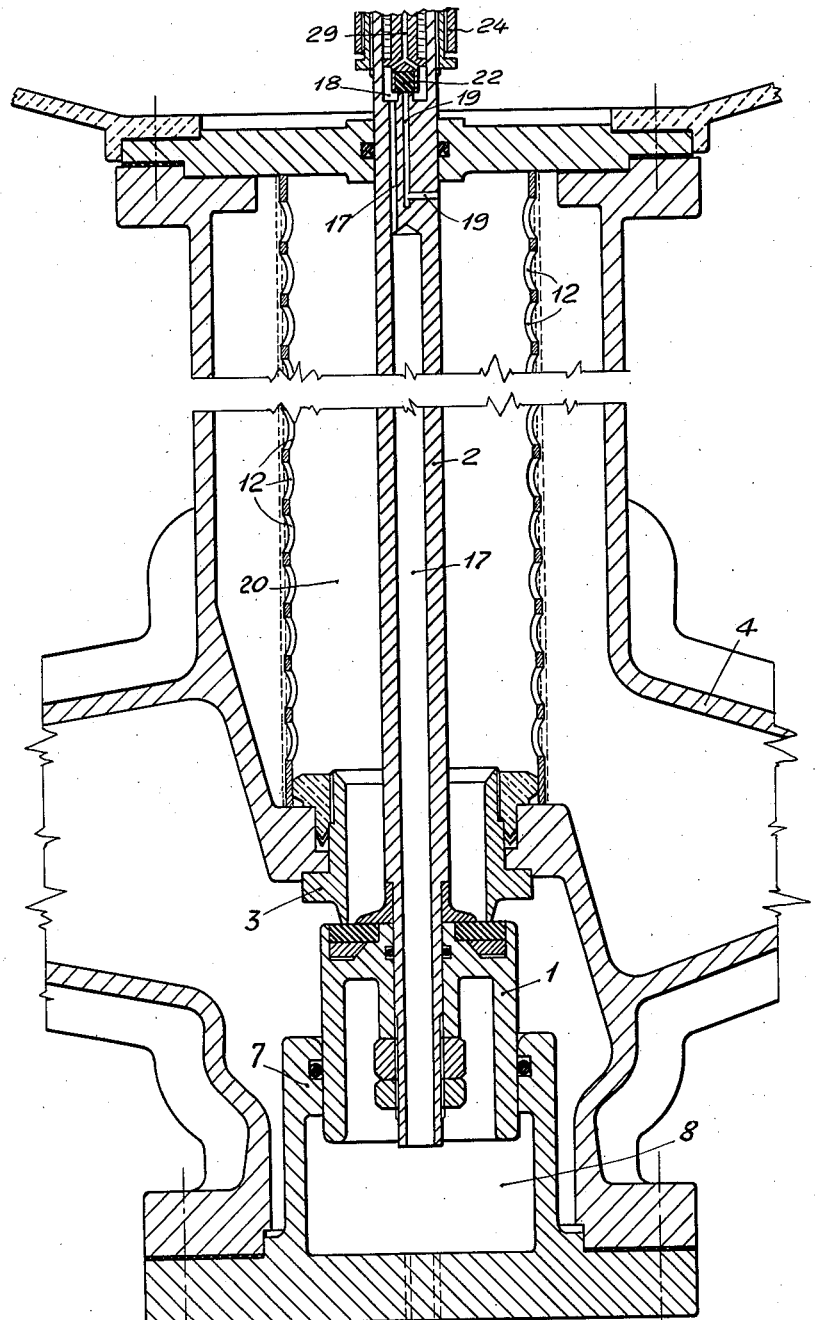
FIGURE 3 is a detailed view on an enlarged scale of the valve, and of its shaft, used in the pressure reducing means of FIGURE 1 according to the present invention.

With further regard to the matter of the operation of the disclosed device, the members 22 and 28 are resilient valve members which, when the valve parts are in the position shown in FIG. 2, close the adjacent valve ports. A slight movement of member 27 by diaphragm 14, however, will open one or the other of the ports, while the other of the members 22, 28, is merely compressed somewhat further. It will be evident that there will be some transmission of thrust to the stem 2 that leads to the main valve member, but this thrust is nowhere near the amount required to move the main valve member. The connection from the diaphragm to the main valve member is thus indirect, and it is the pressure conditions existing on opposite sides of the main valve member that effects the movement thereof. It will be evident that this is brought out because the members 22 and 28 are resilient.

Only a delay in this booster control can bring the membrane 14 to actuate directly on the shaft 2, inasmuch as the closing and opening steps of the valve are controlled by the pressure variations in the chamber 8.

In the disclosure as set forth above it will be clearly seen that the pressure reducing means according to the present invention allows a reduced pressure to be secured whose value is perfectly checked; further it will be secured whatever the position of the valve, from its closed position to its position of greatest opening.

What I claim is:

1. A pressure reducer for fluids, especially for gas, comprising in combination: a housing, a high pressure chamber, a low pressure chamber, and an intermediate pressure chamber in the housing, a port connecting the high pressure and low pressure chambers, a valve piston controlling said port, said valve piston having a rod attached thereto, a body member attached to said rod, a valve member in said body member having a limited amount of axial movement in said body member, a diaphragm attached to said valve member, a spring acting on the diaphragm in the direction in which said valve piston moves to open said port, one side of said diaphragm being exposed to pressure in said low pressure chamber for urging said diaphragm in the direction in which said valve piston moves for closing said port, said body member having chamber means therein in which said valve member is located and which chamber means communicates with said intermediate pressure chamber, a first passage leading from said chamber means to said high pressure chamber, a second passage leading from said chamber means to exhaust, said first and second passages terminating respectively in first and second ports in said body member opening into said chamber means adjacent said valve member, said first and second ports both being closed by said valve member in a predetermined position thereof in said body member, said first port only being opened by said valve member when said diaphragm is moved by the pressure acting thereon whereby to move said valve member in one direction from said predetermined position in said body member, and said second port only opened by said valve member when the diaphragm moves under the influence of the spring acting thereon whereby to move said valve member in the other direction from said predetermined position in said body member.

2. A pressure reducer according to claim 1, in which said body member includes a first sleeve connected to said rod and inside which said valve member is located, a second sleeve slidably mounted on said first sleeve and having limited axial movement thereon, a pin connecting the valve member with said second sleeve, slot means in the first sleeve for the passage of said pin therethrough, and said diaphragm being attached to said second sleeve.

3. A pressure reducer according to claim 1, in which said passages enter said body member from opposite ends so the ports pertaining thereto are in opposed relation, said valve member being disposed between the said ports, and resilient means on opposite ends of said valve member engaging and normally closing the respective ports but operable for opening either of said ports when moved in a direction away from the respective port.

4. A pressure reducer according to claim 1, in which said body member comprises a sleeve attached to the end of said rod, a counter bore in the end of said rod opening into the sleeve, a cup portion on the end of the sleeve opposite its connection with the rod opening toward the rod, said valve member being disposed within said sleeve, said passages opening axially through the bottom of said counter bore and the bottom of said cup portion, said valve member having resilient members on its opposite ends engaging the ends of said passages normally closing both passages and movable in one direction to open one of said passages and in the other direction to open the other of said passages, said chamber means comprising the interior of said counter bore and the interior of said cup portion, a passage through the valve member connecting the counter bore with the cup portion, and sealing means movably connecting the valve member with the sleeve and sealing said chamber means.

5. A pressure reducer according to claim 4, in which the means movably connecting the valve member with the sleeve comprises flexible bellows means.

6. A pressure reducer valve having a housing with a high pressure inlet chamber and a low pressure outlet chamber, a port connecting said chambers, a valve piston movably mounted adjacent said port for varying the effect of the effective area thereof, said piston on one end having a smaller area exposed to the high pressure, an intermediate pressure chamber in which the valve piston is slidable and within which the opposite end of said valve piston is located, a rod attached to and extending from said valve piston, a diaphragm having one side exposed to the pressure in the low pressure chamber and having a spring bearing on the other side, lost motion means connecting said diaphragm with said rod, said lost motion means including valve means having a first part connected to said rod and a second part connected to said diaphragm, said first and second parts being relatively movable, said valve means having a first fluid connection leading therefrom to said intermediate pressure chamber, a second fluid connection to exhaust, and a third fluid connection leading therefrom to said high pressure chamber, all of said connections being in said first part and opening into a common chamber formed in said first part, means including a valve member carried by said second part and normally positioned in said common chamber in said first part so as to close off said high pressure connection and said exhaust connection while continuously leaving said first connection open, said valve member being movable together with said second part relative to said first part by the diaphragm when the pressure acting thereon varies for opening said high pressure connection or the exhaust connection to connect the same with said first connection to thereby vary the pressure in said intermediate pressure chamber to thereby develop a bias on said valve piston so as to urge said valve piston in a direction to follow said diaphragm and to vary the effective area of said port so as to offset the change in the pressure acting on said diaphragm.

References Cited in the file of this patent
UNITED STATES PATENTS

| | | |
|---|---|---|
| 737,682 | Waring | Sept. 1, 1903 |
| 932,262 | Ford | Aug. 24, 1909 |